Patented Mar. 25, 1930

1,752,049

UNITED STATES PATENT OFFICE

CHARLES O. YOUNG, OF CHARLESTON, WEST VIRGINIA, ASSIGNOR TO CARBIDE & CARBON CHEMICALS CORPORATION, A CORPORATION OF NEW YORK

PRODUCTION OF HALOGEN SUBSTITUTION PRODUCTS OF OLEFINES

No Drawing. Application filed January 8, 1927. Serial No. 160,008.

My invention relates to the production of halogen substitution products of olefines and especially to a method of production in which ethylene or propylene dichloride or dibromide is treated with an alkaline solution at high temperatures and under pressure.

It is well known that when ethylene dichloride is treated with an alcoholic solution of potassium hydroxide, vinyl chloride is formed. The reaction is as follows:

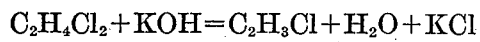

This reaction proceeds very slowly, and even after several days the yield is far from that theoretically possible. This process, as heretofore carried out, is not practical commercially because of the small yield, long time required and expense entailed in the use of an alcoholic solution of the alkali.

I have found that the same reaction can be carried out in a much shorter time, with a higher yield and that an aqueous solution of sodium or potassium hydroxide may be used instead of an alcoholic solution of potassium hydroxide if the reaction be carried out at relatively high temperatures.

If propylene dichloride be treated with an alcoholic solution of potassium hydroxide, propenyl chloride $CH_3CH:CHCl$ will be formed slowly. I have discovered that if propylene dichloride is treated with an aqueous solution of sodium or potassium hydroxide at a relatively high temperature the reaction takes place much more rapidly and the product consists almost entirely of isopropenyl chloride, $CH_3CCl:CH_2$.

An object of my invention is to produce halogen substitution products of olefines by a method which shall give a higher yield than that previously known and which shall require less time. Another object of my invention is to devise a method for the production of halogen substitution products of olefines in which it is not necessary to use alcohol. A further object of my invention is to permit the use of sodium hydroxide instead of potassium hydroxide if desired. The above and other objects of my invention will be evident from the following description of my improved process.

In carrying out the production of vinyl chloride in accordance with my invention ethylene dichloride is treated with an excess of a strong alkali, such, for example, as sodium hydroxide in aqueous solution. The concentration of the alkali may vary from 0.1% to 25%. Although the reaction proceeds at 80° to 100° C., it is greatly accelerated by higher temperatures, such as those from 140° to 160° C. The reaction is carried out in a closed vessel in order that the pressure may permit a high reaction temperature. Means are provided for agitating the reaction mixture since intimate contact between the dichloride and alkaline solution is essential for rapid reaction, the rapidity of the reaction being to some extent dependent upon the efficiency of this mixing. The vinyl chloride, being a volatile liquid, is withdrawn through a suitable fractional condensing system to remove any water and ethylene dichloride which accompany it, and it is then liquefied in a low temperature condenser; or it may be liquefied at ordinary condenser water temperature under pressure. Ethylene dichloride boils at about 84° C. I have found that the yield of vinyl chloride under these conditions will be almost that theoretically possible.

I have found that vinyl bromide may be formed from ethylene dibromide in a similar manner with high yield and in a much shorter time than has been possible heretofore.

Propylene dichloride may be treated in the same manner to produce isopropenyl chloride, the temperature in the reaction vessel being slightly higher than in the preparation of vinyl chloride, the pressure being maintained at from thirty to fifty pounds per square inch.

Mixtures of ethylene and propylene dihalides may be treated in a similar manner to form mixtures of the halogen substitution products of olefines.

What I claim is:

1. The method of making mono-halogen substitution products of olefines which comprises heating an olefine dihalide under pressure with aqueous caustic alkali to a temperature above the boiling point of the dihalide.

2. The method of making isopropenyl chloride which comprises heating propylene dichloride under pressure with aqueous caustic alkali to a temperature above the boiling point of the dichloride.

3. The method of making isopropenyl chloride which comprises heating propylene dichloride with aqueous caustic alkali, under vigorous agitation, to a temperature above 140° C.

In testimony whereof, I affix my signature.

CHARLES O. YOUNG.